June 19, 1956 W. H. RUPP 2,751,425
METHOD AND APPARATUS FOR MIXING AND CONTACTING FLUIDS
Filed Feb. 1, 1951 4 Sheets-Sheet 1

Walter H. Rupp Inventor
By W. O. ? Heilman Attorney

June 19, 1956 W. H. RUPP 2,751,425
METHOD AND APPARATUS FOR MIXING AND CONTACTING FLUIDS
Filed Feb. 1, 1951 4 Sheets-Sheet 2

Walter H. Rupp Inventor
By W. O. J Heilman Attorney

Walter H. Rupp Inventor

June 19, 1956   W. H. RUPP   2,751,425
METHOD AND APPARATUS FOR MIXING AND CONTACTING FLUIDS
Filed Feb. 1, 1951   4 Sheets-Sheet 4

Walter H. Rupp   Inventor
By W. O. Heilman   attorney

United States Patent Office 2,751,425
Patented June 19, 1956

2,751,425

METHOD AND APPARATUS FOR MIXING AND CONTACTING FLUIDS

Walter H. Rupp, Mountainside, N. J., assignor to Esso Research and Engineering Company, a corporation of Delaware Application February 1, 1951, Serial No. 208,955

4 Claims. (Cl. 260—683.4)

The present invention relates to methods and apparatus for mixing or contacting liquid or liquefied materials one with another. According to this invention, the liquid materials handled may be miscible or immiscible, including mixtures of two or more such materials, and may contain normally gaseous materials dissolved or otherwise combined therein, as well as finely divided solid materials suspended in a liquid medium. The invention also contemplates an improved system for bringing such materials into intimate contact by mixture or dispersion for any suitable purpose, including the absorption or solution of one material in another, the formation of emulsions, and contact for the purpose of bringing about chemical reaction between two or more liquid materials, alone or in the presence of catalyst materials. More particularly, the invention relates to a system in which the materials to be mixed or contacted are introduced as a combined stream of such materials, and passed in concurrent flow relation through a mixing or contacting zone, or from one zone to another, by way of opposed jet discharge conduits disposed so as to be submerged in a body of the discharged materials maintained as a liquid pool thereof in a mixing or contacting zone.

Various methods and means have been devised in the past for the preparation of intimate mixtures of two or more liquids, or of a liquid with a gas, in which the materials have been forced under pressure through jets of restricted internal diameter into a body of the materials being mixed. A common procedure has been to force such materials through single orifices at velocities of from 3 to 100 ft. per second. In such systems, energy consumption tends to be excessive, and the mixing or contacting achieved may be inefficient due to the tendency for the jetted streams of material to retain their individual identities, thereby creating dead spots in the body of materials into which they are discharged. To overcome these conditions, it has been proposed that opposed jets be employed.

It is an object of the present invention to provide a method and apparatus which will produce intimate mixtures and fine grained dispersions of the materials to be brought into contact, and increase the intimacy of contact as compared with what has been obtainable heretofore. It is a further object of the invention to jet the materials to be mixed or contacted through opposed jets with substantially the same kinetic energy, which may be applied thereto from a substantially common source. It is also an object of the invention to provide a method and means for contacting liquid materials in a confined chamber or zone to obtain intimate mixing or dispersion of the materials therein by jetting the materials into a pool thereof in the zone so as to cause the jetted streams to impinge within the pool in a plane perpendicular to the axis of the jets facilitating heat dispersion into the liquid pool, and reducing the possible formation of "pockets" or "dead spots" in the contacting zones. A still further object is to produce substantially instantaneous contact of the jetted materials as a result of the planar dispersion effect produced by impingement of the jetted streams. Another object of the invention is to provide an opposed jet structure in which the pet elements thereof are constructed in such fashion as to be substantially fixed in aligned, coaxial opposition, and in a predetermined spaced relationship, and which may be employed in any operation using opposed jets for contacting one fluid with another.

In a preferred form of the invention, it is proposed that the materials to be mixed or contacted be passed concurrently into and through the system employed so as to provide for initial contact or partial mixing in advance of discharge through an opposed jet structure wherein each jet has another jet opposed thereto in relatively closely spaced relation, and wherein the premixed materials are supplied to each of the jets from a common source. The invention is not limited to this particular type of operation, however, and may also be employed to accomplish original contact of the materials derived from separate source, as for example in an extraction process in which a selective solvent is discharged from one of two opposed jets and a charging stock from the other to effect intimate dispersion annd contact of the materials involved. Likewise, in a system such as for sweetening naphthas by contacting with caustic soda or with sodium or calcium hypochlorite solutions, the treating solution and the material to be treated preferably may be introduced separately through opposed jets. The distance between the jets may be varied, but should be such that the jetted streams of materials issuing therefrom will impinge one upon the other before their velocity head has been dissipated appreciably. As employed in this description, the term jet contemplates an orifice of restricted diameter, relative to a supply conduit means connected thereto, through which a fluid stream is discharged with a pressure drop over the orifice of from two to twenty pounds per square inch, and preferably from six to eight pounds per square inch.

In the case of a single jet or orifice discharging into a body of liquid, the frictional effect at the surface of the discharge stream causes a shearing action on both the stream and the main body of relatively quiescent liquid into which discharged, and a dispersion is obtained by the shearing or tearing off of tiny particles from the surface of both the stream and the liquid into which it is discharged. In operation, however, that portion of the main body of liquid adjacent the stream soon acquires a considerable velocity parallel to the stream itself, thereby greatly reducing the shearing tendency. Attempts to further increase this shearing force by employing increased jet velocities have not have been successful, and this is believed to be due to the fact that at higher velocities, the kinetic energy of the moving particles of the stream carries them so far from the point of discharge that they reach a second zone where the stream has expanded and the shearing effect is substantially lost. The use of opposed jets obviates reliance solely on the shearing effect since the impingement of one stream upon another creates a greater dispersing force, and produces a zone of intensive agitation in the body of materials surrounding the point of impingement.

It is contemplated that the invention may have general application not only in the accomplishment of intimate mixtures of miscible materials, but also for effecting finer grained dispersions of immiscible materials, as in the absorption of olefins from their admixtures with paraffins in sulfuric acid, the selective or non-selective polymerization of olefins, either in substantially pure form or in admixture with paraffins in the presence of sulfuric acid or other catalytic acids, the production of alcohols from olefins or olefinic admixtures with paraffins in conjunction with sulfuric acid, and particularly for the alkylation of isoparaffins with olefins in the presence of a liquid catalyst such as sulfuric acid. As previously mentioned, the invention is also contemplated for employment such as in the treatment of hydrocarbons with caustic solutions for sweetening, or as in a lead sulfide-sulfur treating process, in the solvent extraction of hydrocarbon oils with phenol, or sulfur dioxide, and the like. Other comparable employment and objects of the invention will be suggested and the invention may be more clearly understood from the following description when it is read in conjunction with the accompanying drawings, in which:

Figure 7:
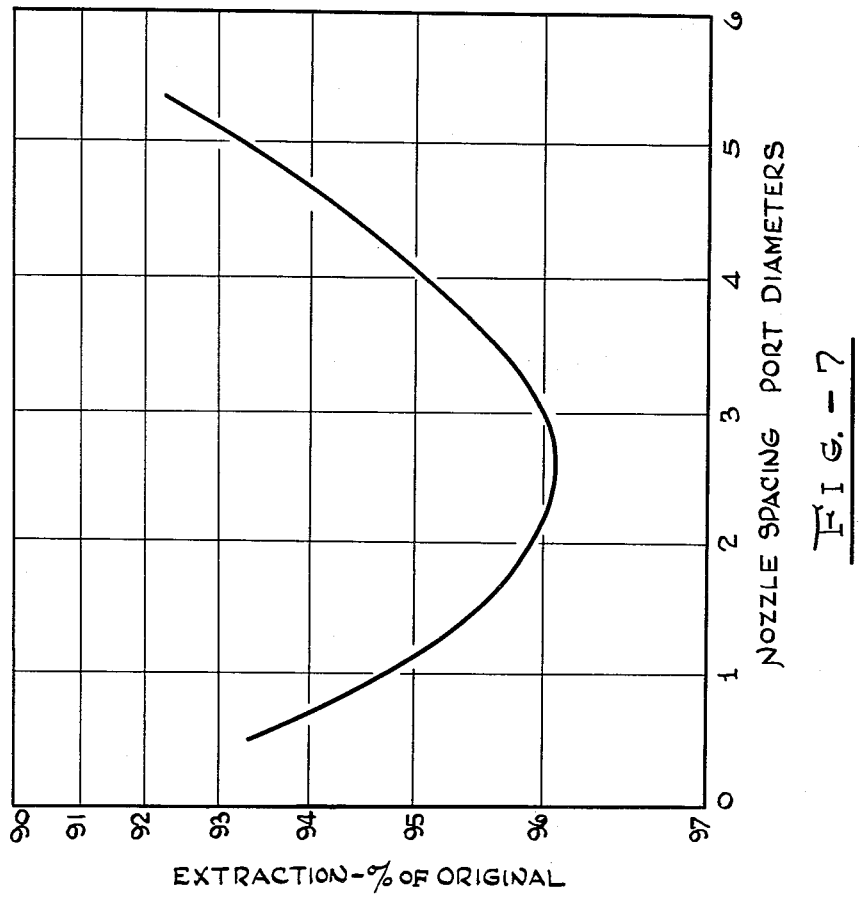
Figure 8:
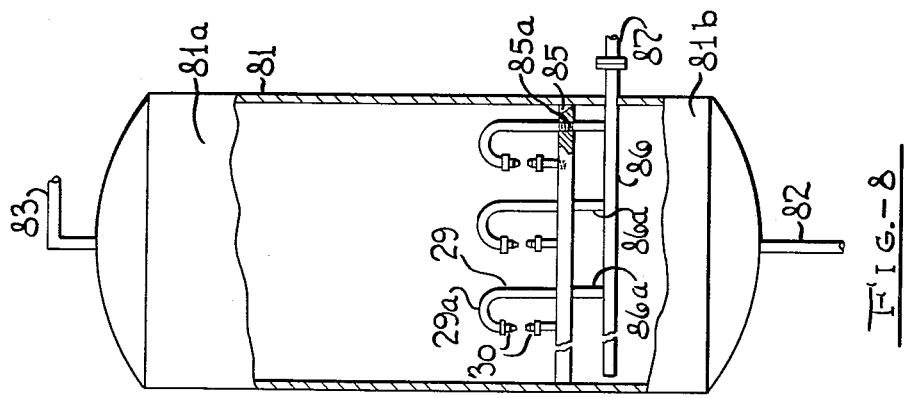

Fig. 7 is a graphic illustration of the efficiency of extraction of alcohol from an alcohol-kerosene mixture using water as the selective solvent and opposed jets spaced from one another at distances of from one to five times the diameter of the jets; and Fig. 8 is a vertical section through an apparatus adapted for contacting two streams of liquid materials derived from separate sources for the purpose of forming mixtures, emulsions or dispersions thereof.

Figure 1:
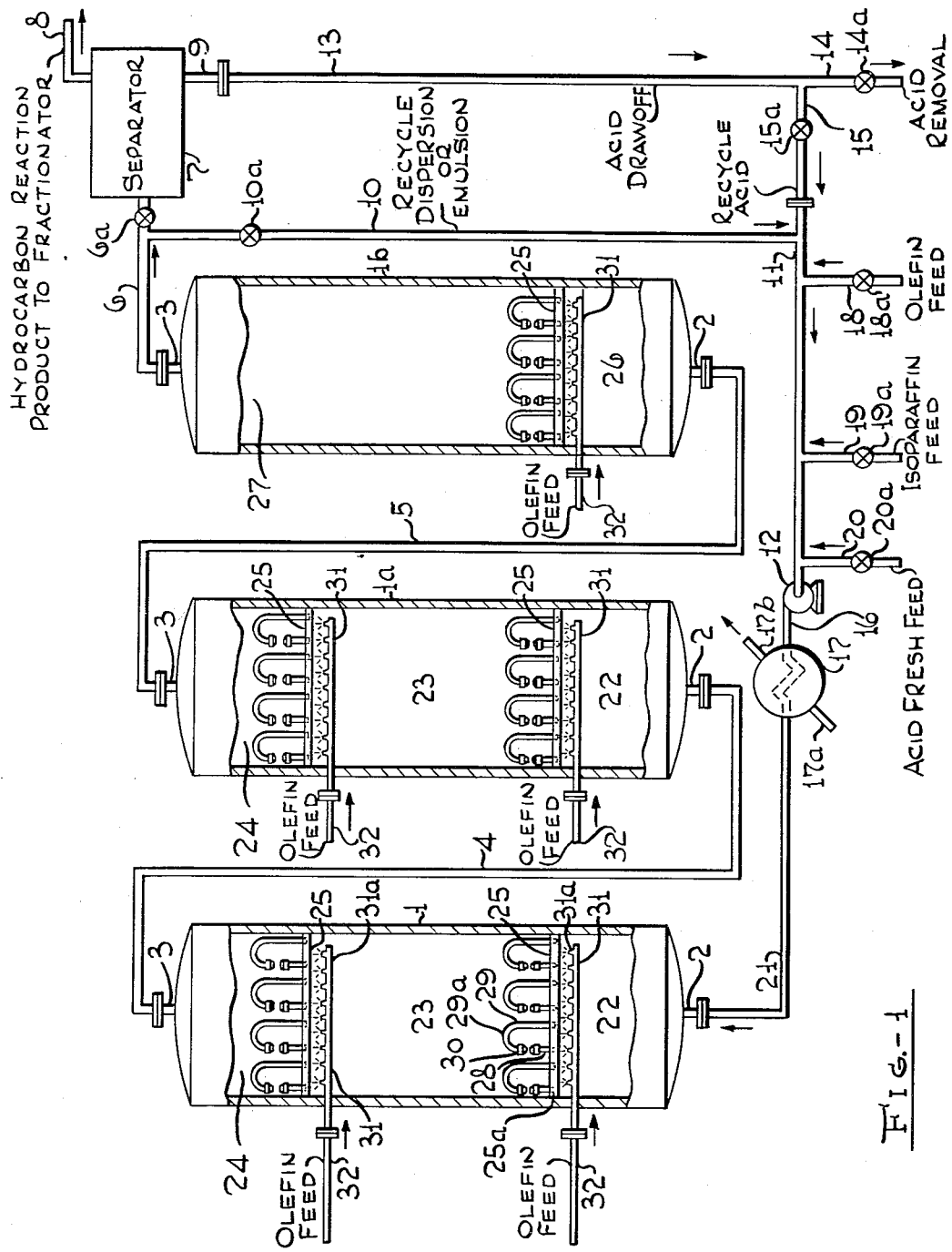
Fig. 1 is a semi-diagrammatic side elevational view of a system according to the invention employed for the alkylation of isoparaffins with olefins in the presence of a liquid catalyst such as sulfuric acid.

Referring to the drawings more specifically, in Fig. 1 the numerals 1, 1a and 1b designate a series of three similar contacting vessels. Each vessel is provided with an inlet 2 and an outlet 3 at opposite ends, the outlets 3 of vessels 1 and 1a being connected respectively to the inlets 2 of vessels 1a and 1b by means of conduit connections 4 and 5. The outlet 3 of vessel 1b is in turn connected by means of a conduit connection 6 to a settler or gravity separator vessel 7 having outlets 8 and 9 for materials separated therein. A bypass line 10 is connected at one end to, and opens from the conduit connection 6 at a point therein ahead of separator 7. At the other end, the bypass line 10 opens into a conduit 11 which is in turn connected to the suction side of a pump 12. A conduit 13 is connected at one end to the separator outlet 9, communicating at the other end with branch lines 14 and 15 of which the line 14 also communicates with the conduit 11. Valves 6a, 10a, 14a and 15a provide for regulation of flow through the respective lines 6, 10, 14 and 15.

The discharge of pump 12 is connected by means of a conduit connection 16 to the inlet of a heat exchanger 17, having inlet and outlet lines 17a and 17b for circulation therethrough of a suitable heat exchange medium. Conduit connections 18, 19 and 20, communicating with the line 11, provide for the introduction of fresh feed materials. The conduits 18, 19 and 20 are provided with valve means 18a, 19a and 20a respectively to regulate flow therethrough. The outlet of heat exchanger 17 is connected by means of conduit connection 21 to the inlet 2 of vessel 1, completing the feed and circulation system.

Each of the vessels 1 and 1a is divided internally into a series of compartments 22, 23 and 24 by means of partition plate members 25. The vessel 1b is provided with a single internal partition 25 dividing the vessel into compartments 26 and 27. Each of the plate members is perforated to provide a multiple series of passageways 25a opening therethrough from one compartment to another, and with a series of discharge conduit members 28 and 29, each having an inlet end communicating with a passageway 25a. These members 28 and 29 are arranged in pairs and each has a nozzle portion or jet discharge element 30 at its outlet end. The conduit members 28, as shown, are short, straight conduit elements extending substantially in the direction of flow through the vessel. The conduit members 29 are substantially similar to the members 28 but of greater length and are provided with a U-shaped, goose-neck portion 29a, with an outlet to receive a jet discharge element 30 disposed so as to be in substantially aligned, opposed, coaxial, spaced relation to a jet discharge element 30 provided on a paired discharge member 28.

On the opposite, downstream side of each of the plates 25 a header member 31 is provided. This member may be of any convenient and suitable shape or form, such as a circular or helical form, the wall of the header being perforated or provided with discharge elements 31a opening toward the surface of the plate 25. Where desired, the elements 31a may be extended into the passageways 25a so as to discharge directly thereinto in any conventional manner. The header 31 in each instance is connected to an inlet conduit 32 for a fresh feed material.

The system as illustrated in Fig. 1 is particularly adapted for employment in the alkylation of isoparaffins with an olefin, in the presence of a liquid catalyst material such as concentrated sulfuric acid. For example, the system is suitable for the alkylation of isobutane and butylenes in the presence of sulfuric acid having a strength of from 90 to 95%, in which the alkylation operation is carried out at temperatures of from about 30° to 60° F. In such a reaction, it is desirable that the isobutane be present in the reactant materials in an amount considerably in excess of the butylene in order to insure complete utilization of the latter material, and to avoid an undesired reaction of the butylene with itself.

In a typical operation, the isoparaffins and olefins should be fed to the system in proportions such as to result in a total feed in which the several components are present substantially as follows:

| | Total feed, percent |
|---|---|
| $C_3$ | 3 |
| Butylenes | 15 |
| Isobutane | 70 |
| Normal butane | 12 |

Normally, the olefin material fed into the system as by way of conduits 11 and 32 may be present in a composition substantially as follows:

| | Percent |
|---|---|
| $C_3$ | 1 |
| Butylenes | 40 |
| Isobutane | 47 |
| N-butane | 12 |

In order to accomplish the desired proportions of butylenes to isobutane in the reaction mixture, therefore, additional isobutane must be made available from some other source. This may be accomplished by recycling unreacted isobutane as later described. Such unreacted isobutane may be present in a composition substantially as follows:

| | Percent |
|---|---|
| $C_3$ | 3 |
| Isobutane | 85 |
| N-butane | 12 |

In the system as illustrated by Fig. 1, the isoparaffins may be introduced as by way of line 19 while introducing sulfuric acid through line 20, both passing through pump 12, where they are premixed and contacted to provide an emulsion or dispersion, into the conduit 16. The emulsion is brought to the required operating temperature in the heat exchanger 17 and passed therefrom, by way of conduit 21, through inlet 2 of vessel 1 into the compartment or chamber 22 therein. Thence, the emulsion, under its inlet pressure, is forced through the passageways 25a in a partition 25, and is discharged through the conduit members 28 and 29 by way of the jets 30 into the compartment or chamber 23. Simultaneously, a portion of the total olefin feed, required for the alkylation of the isobutane and butylene fractions in the dispersion, is introduced into the compartment 22 adjacent the downstream side of plate 25 as by way of inlet line 32, header 31, and the discharge elements 31a. This olefin feed is mixed with the emulsified materials during discharge through the elements 30, and by the agitation of the body of emulsified materials in compartment 23 caused by impact of the streams of materials issuing from the conduit members 28 and 29 through the jet discharge elements 30. From the compartment 23, the emulsion passes onward through the next partition plate member 25 in vessel 1 in a manner as just described, and from compartment 24 the emulsion is then introduced into the compartment 22 of vessel 1a passing through vessel 1a and compartments 23 and 24 thereof and, by way of the plates 25 and the conduit discharge members associated therewith, in similar fashion to that previously described. From the compartment 24 of vessel 1a, the emulsion is introduced into compartment 26 of the vessel 1b by way of the conduit connection 5 and inlet 2 and is again forced through a plate 25 provided with jet discharge elements, as described in connection with the previous vessels in the series, and thence into compartment or chamber 27. Each time that the emulsion is passed through one of the partition plate members 25, an additional portion of fresh olefin feed is added in the manner described with reference to the compartment 22 of vessel 1.

During normal operation of the system as contemplated by this invention, a body of the materials to be contacted or reacted is maintained in each contacting chamber or zone which comprises a dispersion, emulsion or mixture of the materials. For convenience, this body of the materials may be termed a liquid reaction or contact pool.

The emulsified materials are withdrawn from the compartment 27 by way of the conduit connection 6 and a major portion thereof delivered to the separator 7 where separation of the emulsion is accomplished. Used acid is withdrawn from the separator by way of outlet 9 and drawoff line 13, while the hydrocarbon materials are withdrawn from the separator 7 by way of the outlet line 8. The hydrocarbon materials withdrawn from the vessel 7, and containing the desired alkylation products are thence passed to fractionation means, not shown, for segregation and withdrawal of the desired products. Excess isobutane derived from the fractionation step is recycled to the alkylation system as by way of line 19. As discharged into the conduit connection 6, it is desirable that for best results, 60% to 80% by volume of the hydrocarbon materials present in the emulsion should be isoparaffin, and that in the emulsion itself, the isoparaffin should represent about 25% to 40% of the total volume. That portion of the emulsion withdrawn from the conduit connection 6 by way of the line 10 is recycled to the system through line 11 and the pump 12. Likewise, a certain portion of the used acid withdrawn from the separator 7 by way of the outlet 9 may be recycled by withdrawal from line 13 by way of line 15 and introduction into the line 11 along with recycled emulsified materials. Such acid as must be removed from the system may be withdrawn through line 14.

In normal operation, the emulsified materials introduced into compartment 22 of the vessel 1 preferably should have a proportional composition of about 50% acid and 50% hydrocarbon materials. The latter contains isoparaffins, normal butane, olefins and recycled alkylate. It is also desirable that a high ratio of isoparaffins to olefins be maintained throughout the operation. Such a ratio may be from about 150:1 to 500:1 in the emulsion. (Expressed otherwise, at least a 4:1 molar ratio of isoparaffin to olefin should be maintained for a good alkylation reaction.) Additional fresh feed olefin materials also may be introduced into the line 11 by way of the conduit connection 18. In passing the emulsified materials from one compartment to another in the respective reaction vessels, it is desirable that the pressure drop through the opposed jets, and from compartment to compartment be maintained within a range in which maximum mixing or contacting is obtained with a minimum expenditure of energy. The lower limit of this range should be as low as possible while retaining good mixing characteristics, and the upper limit preferably not more than about 20 pounds per square inch. A suitable range would be between about two and twenty pounds per square inch, and normally from about six to about eight pounds per square inch.

In another typical operation, a feed stock having a composition as follows:

| | Weight percent |
|---|---|
| $C_3$ and lighter | 1.1 |
| Isobutylene | 13.4 |
| Butene-1 | 12.9 |
| Butene-2 | 13.5 |
| Isobutane | 32.3 |
| Normal butane | 23.1 |
| Butadiene | 1.5 |
| $C_5$ and heavier | 2.2 | may be liquefied and passed under a pressure of between about 35 and about 100 pounds per square inch, preferably 87 pounds per square inch, at a temperature between 25° F. and about 30° F. or slightly lower in admixture with sulfuric acid of between about 60% and about 70%, preferably 62%, in such an amount as to give a final admixture of about 35–45 volume per cent of acid, through a system similar to that illustrated in Fig. 1 so as to cause violent impingement of the hydrocarbon and acid mixture in each zone by means of the opposed jet arrangement illustrated. The resultant emulsion may then be withdrawn from the final contacting zone and repeatedly recycled while continuously removing a portion to a separator or settler where the hydrocarbon materials and settled acid are separately withdrawn. The acid is then passed through a regenerator operation where it is heated and steam stripped at a temperature of about 200° F. and 240° F. to recover substantially all of the absorbed isobutylene and a small amount of normal butenes. The overhead from such regenerator operation may be caustic washed, and condensed butyl alcohol settled therefrom. By removing pressure from the system at this point, a gas may be recovered which, when washed with water to remove alcohols, may be recompressed and fractionated to give a product having substantially the following composition:

| | Weight percent |
|---|---|
| Isobutylene | 93.8 |
| Normal butenes | 1.5 |
| Butanes | 2.9 |
| $C_5$ and heavier | 1.8 |

Although both operations described have been set forth with reference to the employment of apparatus such as illustrated in Fig. 1, it is to be understood that under some conditions it may be desirable to reduce or increase the contacting zones to any desired number other than those as illustrated in the drawing. For example, the conduit 21 may be connected directly to a vessel such as the vessel 1b or the conduit 4 may be connected directly to the conduit 6. In any event, the number of vessels and the arrangement of contacting zones therein will be determined by the degree and length of contact required to obtain the desired results.

Figure 2:
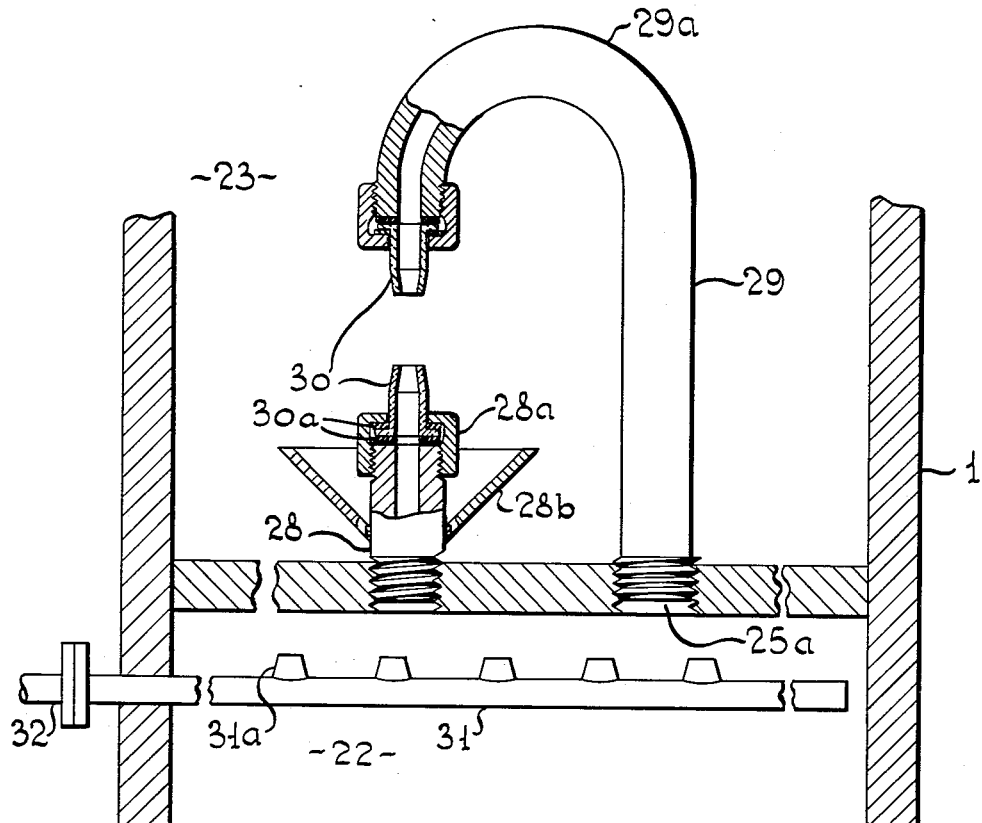
Fig. 2 is an enlarged vertical section through a portion of an opposed jet plate structure of the character illustrated in Fig. 1 showing the elements thereof in greater detail.

The particular form of opposed jet structure indicated by Fig. 1 is more clearly illustrated by the showing of Fig. 2. As shown, the conduit member 28 is a short tubular member provided with a coupling element 28a at its upper end, which element is adapted to secure a jet discharge element or nozzle 30 in fluid-tight relation to the outlet of the member 28. As shown, the jet discharge element 30 is a substantially frusto-conical, hollow element having a flanged base end portion, suitable sealing gaskets, such as indicated by the numeral 30a, being disposed between the flanged base acid portion, the upper end of the conduit member, and the coupling element 28a. Internally, the base of the element 30 is reduced from its juncture with a conduit member 28 or 29 toward the orifice or discharge end of the element. The element 30 is preferably formed of a corrosion and erosion resistant material, and may be glass, porcelain, stainless steel, plastic or the like. The conduit member 29 is a longer conduit member than the member 28, and, as previously described, is provided with a U-shaped gooseneck portion 29a giving the general appearance of an inverted J to the member as a whole. The outlet end of the portion 29a is provided also with a nozzle element 30 similar in every respect to that provided for the member 28. The length of the respective members 28 and 29 including the nozzle elements, normally is gauged to provide a spacing between the tips of the two nozzle elements of from 1 to 20 times the internal diameter of the elements at the tip or orifice. Preferably, this spacing is gauged to provide a spacing which is from 1 to 5 times such internal tip diameter. As described with reference to Fig. 1, the members 28 and 29 are arranged in pairs, there being an equal number of members 28 and members 29 with a total number of passageways 25a through the plate 25 equal to the sum of the number of members 28 and 29. The element 28b shown in the drawing is a cup-like element, preferably a hollow, frusto-conical element secured to the member 28 in inverted position, by its apex end, and providing for upward reflection of turbulent fluid in the vicinity of the jets.

Figure 3:
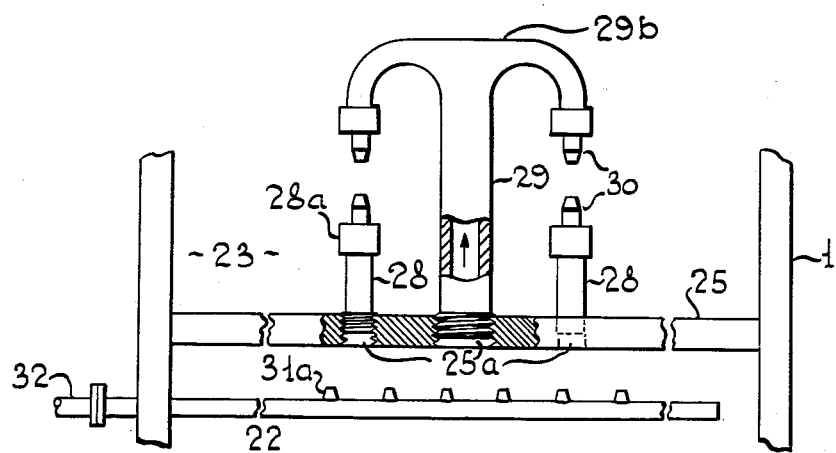
Fig. 3 is a similar view showing another form of opposed jet plate structure.

In Fig. 3 is shown another form of jet plate structure in which the members 29 are provided with a dual gooseneck upper end portion 29b having common communication with the main portion of the member. In all other respects, the members, as shown are formed and assembled in a manner similar to that illustrated and described with reference to Fig. 2, except that whereas in the arrangement as shown in Figs. 1 and 2, the total number of members 28 will be equal to the total number of members 29, in the arrangement as illustrated by Fig. 3, the members 28 will constitute two-thirds of the total number of conduit members, and the members 29 one-third thereof. Also in order to insure substantially uniform flow from the respective jets, the internal transverse area of the members 29, and of the passageway 25a in which applied, should be substantially twice the dimension of the individual members 28 and their related passageways.

Figure 4:
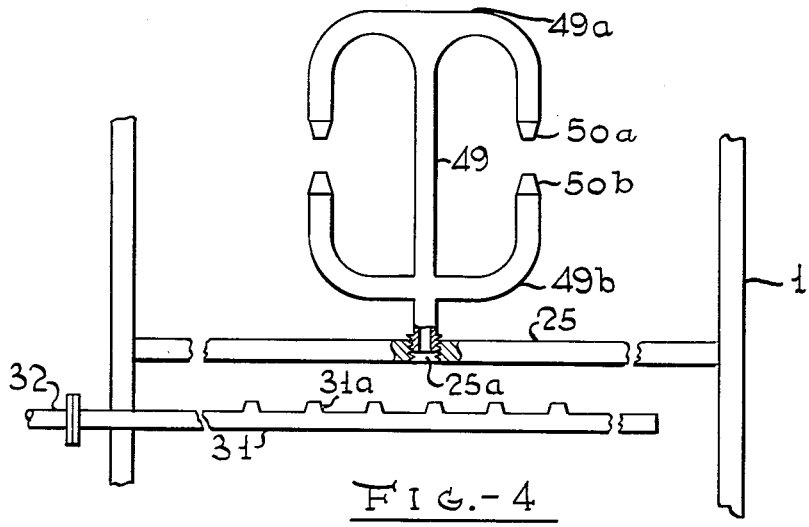
Fig. 4 is a similar view illustrating a third form of opposed jet plate structure.

In Fig. 4, the opposed jet structure is a unitary structure consisting of a main conduit section 49 communicating at its inlet end with a passageway 25a in plate 25 and provided with at least two branch conduit portions 49a and 49b extending laterally from the main portion, and arranged so that the outlet ends 50a and 50b thereof are disposed in substantially aligned, opposed, coaxial, spaced relation. The outlet ends may be formed so as to provide a jet discharge nozzle outlet or orifice portion of reduced cross-sectional area in the manner illustrated, or, if desired, may be provided with separate nozzle outlets similar to those illustrated in Figs. 2 and 3.

Figure 5:
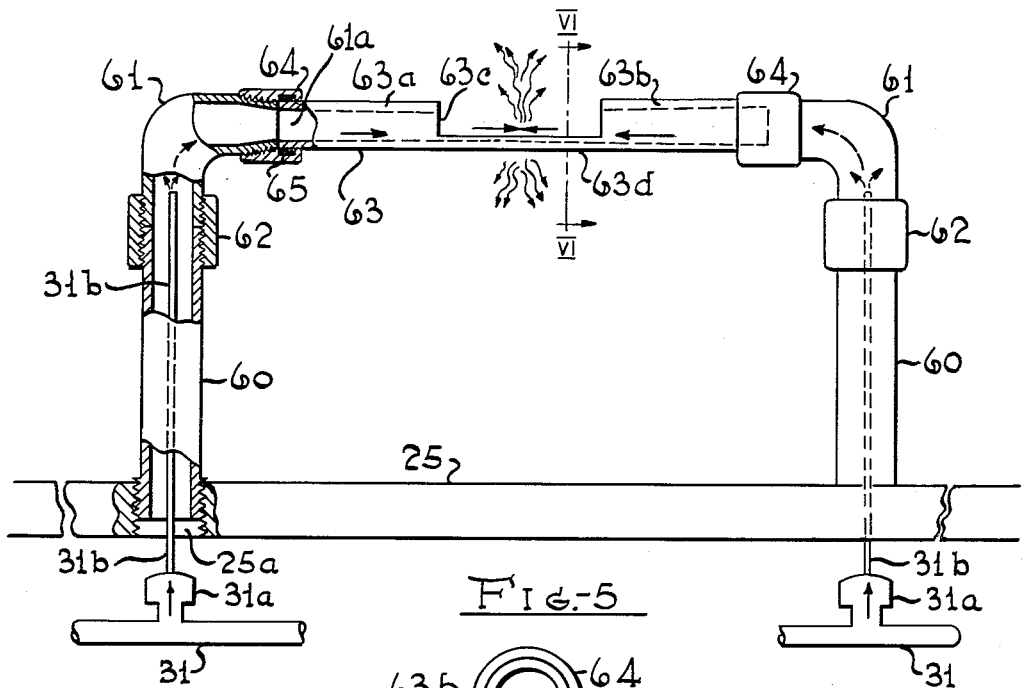
Figs. 5 and 6 illustrate still another form of opposed jet plate structure, Fig. 6 being a vertical section along the line VI—VI of Fig. 5.
Figure 6:
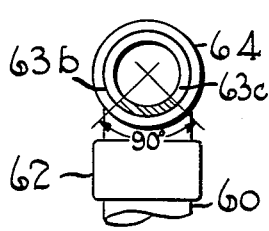

In the arrangement illustrated by Figs. 5 and 6, the partition plate member 25 is provided with an even number of passageways 25a, and a similar number of conduit members 60, each communicating at one end with a passageway 25a. At the other, or outlet ends, the members 60 are provided with a laterally extended outlet portion, which as shown is an L member 61 secured to the outlet end of the conduit 60 as by means of a coupling 62. The other ends of the L members are disposed so as to be opposed one to another in coaxial pairs over the entire area of the plate 25, and in laterally spaced relation along the common axis of each pair of L members.

Although where desired, the L members may be formed at their outlet ends substantially as the outlet ends 50a and 50b of the opposed jet structure shown in Fig. 4, so as to provide for jet discharge therefrom, or they may be provided to receive jet nozzle elements such as elements 30 of Figs. 1, 2 and 3, it is preferred that each pair of conduits and the L members associated therewith be connected by means of a tubular insert 63. This insert as shown consists of identical end portions 63a and 63b, an arcuate cut out portion 63c and an intermediate connecting web portion 63d joining and spacing the portions 63a and 63b. The portions 63a and 63b each provides an internal passageway extension 61a of the L's 61, which passageways are tapered from the L toward the cutout portion 63c, forming a nozzle or jet orifice for discharge of fluids therethrough. The cutout portion 63c includes a major portion of the cross-sectional area of the insert 63, included within an angle of not less than 180°, and preferably greater than 180°. It is desired that the connecting web 63d be reduced to a minimum dimension, determined by and consistent with the structural requirements to avoid excessive breakage in handling and operation. As shown, the web 63d is included in an angle of about 90°, and the cutout portion 63c is defined by an angle of about 270°. The cutout portion may be further defined, longitudinally, by a dimension equal to from about 1 to 20 times the internal diameter of the outlet ends of the passageways 61a in portions 63a and 63b, and preferably from about 1 to 5 times the internal diameter of the outlet ends.

The inserts 63 may be mounted between pairs of L members 61 in any convenient fashion. As shown, sleeve members 64 at each end of the insert are provided at their outer ends for threaded engagement with the L members 61, with sleeve type gasket elements 65 providing for a fluid-tight seal in the assembly. Also, as illustrated, the inserts 63 provide structural means for insuring predetermined coaxial alignment and spacing of the nozzle jets. As shown in the drawing, the force of impact of the jet streams tends to disperse the liquids radially in a plane perpendicular to the axis of the jets. The fine dispersion produced by the impact of the streams likewise is effective in accomplishing substantially instantaneous contact of the stream materials which is continued as a result of agitation of the liquid pool in the vicinity of the point of impact.

Also illustrated in Fig. 5, is an alternate means for introducing one of the ingredient materials of the mixture, emulsion or dispersion to be produced. As shown, a header member 31 is provided with a plurality of discharge elements 31a, each having an injector tube 31b extended through a passageway 25a into a conduit 60, permitting introduction of an ingredient material into the main body of materials flowing through the conduits 60, immediately prior to discharge from the opposed jet nozzles.

Although, as disclosed, the spacing relationship of the jet discharge outlets is a critical factor according to this invention, the specific critical relationship may vary from one process utilization to another, depending upon the viscosities of the materials to be handled, the operating temperature of the system in which contact is to be effected, permissible pressure drop over the jets, and other comparable factors peculiar to the type of employment. In any specific installation, the spacing of the opposed jet outlets will be determined by a relationship between the degree of contact obtained and the energy input required.

As another specific example of an opposed jet system, reference may be had to one employed for the water extraction of isopropyl alcohol from a kerosene-alcohol mixture, employing opposed jets operated in a pool of the contacted materials in a confined contacting zone, the kerosene-alcohol mixture being introduced through one jet, and water by way of another opposed thereto. In such a system, the degree of extraction is largely dependent upon, and determined by the extent of surface contact between the liquid to be extracted and the selective solvent employed. Turbulence, shearing and dispersion of the materials in the contacting zone is desirable, and the greater the degree of such action, the greater the degree of contact efficiency. The effectiveness of contact is measurable in such a system by the degree of extraction attained.

In the system employed, two jet nozzles each 0.1 inches in diameter were disposed so as to discharge in opposition to one another into a contacting zone originally filled with water, the selective solvent for isopropyl alcohol. The nozzles were arranged for variable coaxially spaced relation, and provision made to measure pressure drop across each nozzle. Jet velocities were varied from 0 to 25 feet per second, the water to kerosene ratio in the system from 0.2 to 2.0 to 1, and the distances between jets was varied from 0.6 to 30 times the diameter of the jets employed.

It was found that the energy required to accomplish a given degree of extraction varied with the distance between jets. This energy was the sum of the kinetic energy of the streams, and the energy necessary to overcome the pressure drop occasioned by the spacing of the jets. In the operation as conducted, the total energy input was converted to a uniform value of foot pounds per pound of the alcohol kerosene mixture extracted.

With a given flow rate, the kinetic energy of the jetted streams remained constant, but as the jet spacing was reduced to less than two and one-half jet port diameters, the energy required to overcome pressure drop increased rapidly. Jet nozzle spacings greater than two and one half port diameters, while reducing pressure drop, also resulted in decreased extraction efficiency for the energy input employed.

The effect of varied jet nozzle spacing on the efficiency of extraction of isopropyl alcohol from its solution in kerosene employing water as a selective solvent for the alcohol, is illustrated graphically by Fig. 7 of the drawings.

Jet nozzles of 0.1 inches in diameter were employed to bring the alcohol-kerosene solution into contact with water in a contacting chamber originally filled with water at room temperatures. The materials to be contacted were introduced through the jets employed with a total energy input of about six foot pounds per pound of the alcohol-kerosene mixture introduced. Spacing of the jets was varied from between about 0.6 to about 5.5 times the diameter of the jets employed, and the degree of extraction of alcohol by the water solvent therefor determined. It was found that the degree of extraction ranged from slightly more than 93% of the total content of isopropyl alcohol in the original mixture at a jet nozzle spacing of 0.6 jet port diameters through slightly more than 96% at a jet spacing of 2½ port diameters to slightly more than 92% of the total content at about 5.5 jet port diameters.

As shown by Fig. 7, as the jet spacing was reduced from about 5.5 jet port diameters, extraction efficiency improved until it reached a maximum at about 2½ port diameters. Also, as shown, as the jet spacing continued to be reduced below 2½ port diameters, efficiency dropped at a rapid rate. Based on the extraction efficiencies as shown by the graph of Fig. 7, it may be said that in the employment of coaxial opposed jets, the spacing of the jets is a critical factor, and that when using jets spaced at distances of from about 1 to about 5 times the diameter of the jet ports, reasonably efficiency extraction results are obtained. Further, it is indicated that for the operation described, the best results were obtained with jet spacings of between about 2 and 3 jet port diameters, and that the optimum was attained in this operation at about 2½ diameters. The ratio of jet diameters to the distance between the jets is applicable to jets of any given diameter, but particularly so where applied to jets having a port diameter less than one inch, and preferably in the range of from 0.1 to 0.5 inch.

A suitable apparatus for bringing together separate streams of two liquid materials to be contacted or mixed is illustrated in substantially diagrammatic form in Fig. 8. This apparatus is of the character such as might be employed for the selective solvent extraction of isopropyl alcohol from a mixture of isopropyl alcohol in kerosene such as previously described. In the drawing, the numeral 81 designates a closed container vessel having an inlet 82 for one of the materials to be contacted and an outlet 83 for a mixture, emulsion or dispersion of the materials after contact. The vessel 81 is divided interiorly into upper and lower chambers or compartments 81a and 81b respectively by means of a perforate transverse plate member 85 disposed at an intermediate level within the vessel and preferably adjacent the lower end thereof. The perforations in the plate provide a plurality of passageways 85a communicating between the chambers or compartments 81a and 81b.

The specific contacting means employed in conjunction with the apparatus as illustrated in Fig. 8 may be any of those illustrated in Figs. 2, 3 or 5, with certain modifications as required to provide for separately jetted streams of the liquids to be contacted. For example, as shown in Fig. 8, the jet structure employed for contacting separate streams of liquid materials is substantially equivalent to that which is illustrated by Figs. 1 and 2. The passageways 85a are provided with upwardly extending conduit members 28 and 29 in pairs. In each pair, however, one of the conduit elements communicates with a header 86 which is in turn connected to a supply conduit 87 extending through one wall of the vessel 81. A header branch element 86a provides for communication between the header 86 and a passageway 85a and thence with a conduit member such as conduit member 29. Other elements of the jet structure are comparable to those illustrated in Figs. 1 and 2 and are designated by the same numerals as in Figs. 1 and 2.

In operation of the apparatus illustrated by Fig. 8, for the purpose of the selective solvent extraction of isopropyl alcohol with water from a kerosene-isopropyl alcohol mixture, water would be first introduced into the vessel by way of the inlet 82 into the compartment 81b and thence jetted by way of conduits 28 through the jet discharge elements 30 into the compartment 81a until this compartment and the vessel had been filled. At that time, the kerosene-alcohol mixture would be introduced by way of the supply conduit 87 through the header 86, thence passing through the branch members 86a into the conduit members 29 and jetted from the elements 30 connected thereto into opposed, impinging relation to the streams of water issuing from the conduits 28 and the discharge elements 30 connected thereto. The mixture or dispersion of the materials thus introduced into the compartment 81a would be removed from the vessel 81 by way of the outlet 83 and separated externally of the vessel 81 to recover separately a water solution of alcohol, and kerosene.

I claim:

1. A method for effecting contact and reaction between at least two liquid reactant materials in the presence of a liquid acid catalyst for the reaction between said materials, comprising initially combining at least said liquid acid catalyst and said least reactive of said reactant materials to form at least a partial mixture of said least reactive material and said liquid acid catalyst, flooding a successive series of separate confined contacting and reaction zones in a reaction vessel with said mixture of materials to provide a common pool of said materials in each said zone, continuously passing said mixture from a common pool thereof in one of said zones into a common pool thereof in a succeeding zone as a plurality of paired, substantially coaxial, opposed jet stream portions, so as to impinge each of said paired jet stream portions against the other in each pair within the pool in said succeeding zone, whereby to create a plurality of areas of intensive agitation within said succeeding zone and to maintain said initial mixture of said materials, separately adding incremental portions of the most reactive of said reactant materials to said mixture in each of said contacting and reaction zones substantially as said mixture is passed from each of said zones into a succeeding zone in said series, and continuously removing contacted materials from the final zone in said series of contacting and reaction zones.

2. An opposed jet fluid contacting device comprising a pair of tubular supply conduit elements, each having an inlet end and an outlet end, a spacer element connecting said conduit elements consisting essentially of a tubular conduit connection between the outlet ends of said pair of supply conduit elements and communicating therewith, and a cut out portion in said conduit connection intermediate the ends thereof, which cut out portion is included in a cross sectional area greater than one half the cross sectional area of said conduit connection and extends longitudinally of said conduit connection for a distance equal to not substantially less than one nor substantially more than twenty times the internal diameter of said connection conduit, said cut out portion at opposite ends thereof substantially defining a pair of opposed, coaxial jet discharge outlets, and means for introducing a fluid material under pressure into each of said supply conduit elements.

3. An apparatus according to claim 2, wherein said means for introducing fluid material into each of said supply conduit elements is common to both of said elements.

4. An apparatus according to claim 2, wherein said means for introducing fluid material into said supply conduit elements includes a manifold conduit for a fluid material, and branch conduits of a diameter less than that of said supply conduit elements, of which each branch conduit is extended into one of said supply conduits, each branch conduit having an outlet end opening within said supply conduit and an inlet end communicating with said manifold conduit.

References Cited in the file of this patent

UNITED STATES PATENTS

| | | |
|---|---|---|
| 1,658,985 | Hessle et al. | Feb. 14, 1928 |
| 1,734,862 | Koerkle | Nov. 5, 1929 |
| 1,762,762 | Coffey | June 10, 1930 |
| 2,082,034 | Smith | June 1, 1937 |
| 2,127,026 | Grindrod | Aug. 16, 1938 |
| 2,356,374 | Blount | Aug. 22, 1944 |
| 2,361,356 | Sachanen et al. | Oct. 24, 1944 |
| 2,379,368 | Matuszak | June 26, 1945 |
| 2,397,326 | Wayne et al. | Mar. 26, 1946 |
| 2,446,783 | Wayne | Aug. 10, 1948 |
| 2,701,184 | Rupp | Feb. 1, 1955 |

FOREIGN PATENTS

| | | |
|---|---|---|
| 18,280 | Great Britain | Sept. 19, 1896 |